April 28, 1970     W. A. SMALL ET AL     3,508,709

MOBILE ADJUSTABLE SPRAYER

Filed July 10, 1968

William A. Small,
George P. Blanchard and
William E. Serbousek,
Inventors.
Koenig, Senniger,
Powers and Leavitt,
Attorneys United States Patent Office 3,508,709
Patented Apr. 28, 1970

3,508,709
MOBILE ADJUSTABLE SPRAYER
William A. Small, Ferguson, Mo., George P. Blanchard, Buellton, Calif., and William E. Serbousek, St. Louis, Mo., assignors to Mallinckrodt Chemical Works, St. Louis, Mo., a corporation of Missouri
Filed July 10, 1968, Ser. No. 743,805
Int. Cl. B05b 9/02
U.S. Cl. 239—287
9 Claims

ABSTRACT OF THE DISCLOSURE

A sprayer comprising a spray boom on wheels for being rolled over the ground for spraying the ground with a liquid, such as a liquid fungicide, insecticide, weed killer, fertilizer, dye, paint or the like. The boom is a tubular boom extending transversely at the lower end of a tubular handle, and having a plurality of spray nozzles spaced along its length. A wheeled support is pivoted on the boom and an adjustable connection is provided between the support and the handle, whereby the boom may be positioned either inboard or outboard of the wheels and its elevation above ground level adjusted.

BACKGROUND OF THE INVENTION

This invention relates to wheeled mobile adjustable sprayers such as are used for spraying a liquid on the ground, e.g., for spraying a fungicidal or insecticidal solution on golf greens or on turf in general. Other uses, such as spraying weed killer and fertilizer solutions, and spraying dye or green paint on turf (e.g., dormant Bermuda grass or other grasses to give it a green appearance when browned out in the winter) may also be mentioned. The invention is particularly concerned with sprayers of the type shown in the coassigned copending application of William A. Small and Fred J. Ginther, Ser. No. 634,416, filed Apr. 19, 1967, issued as U.S. Patent No. 3,423,027, Jan. 21, 1969, having a spray boom carrying spray nozzles on a wheeled support wherein the boom is adjustable to different elevations relative to the ground so as to provide for proper spray application from the nozzles, in accordance with the pressure of the liquid being sprayed, for full spray coverage without excessive overlapping of spray patterns such as involves waste of liquid and possible overtreatment of portions of the area being treated.

The first sprayer shown in said copending application has the spray boom inboard of the wheels, and the second sprayer shown therein has the spray boom outboard of the wheels. Accordingly, the first sprayer cannot be pulled without having the wheels track over the sprayed area, and the second sprayer cannot be pushed without having the wheels track over the sprayed area. Neither can be pushed, of course, without having the operator track over the sprayed area. There are certain instances when an operator may prefer to push a sprayer (his tracking over the sprayed area being immaterial) but without having the wheels track over the sprayed area, requiring the use of the first sprayer, and there are certain instances (as when spraying dye or paint) when the operator needs to pull a sprayer without having the wheels roll over the sprayed area and without himself walking over the sprayed area, requiring the use of the second sprayer. Thus, while the sprayers shown in said copending application are each individually generally satisfactory, the two different types have been needed to suit different circumstances and operators' preferences.

SUMMARY OF THE INVENTION

Among the several objects of this invention may be noted the provision of a sprayer of the class described which is so constructed that the spray boom may be positioned either outboard of the wheels (i.e., outward from the wheels in relation to the position of the operator of the sprayer) or inboard of the wheels (i.e., between the operator and the wheels), to avoid the necessity for two different sprayers to suit different requirements; the provision of such a sprayer adapted for adjustment of the elevation of the spray boom above ground level for obtaining proper spray application, in accordance with the pressure of the liquid being sprayed, for full spray coverage without excessive overlapping of spray patterns; the provision of such a sprayer which is well balanced either when pushed or pulled; and the provision of such a sprayer which is of simplified, economical light-weight construction, and which may be made of straight lengths of pipe or tubing, so as to eliminate pipe or tube bending operations in its manufacture.

In general, a sprayer of this invention comprises an elongate tubular handle and an elongate tubular spray boom extending transversely of the handle at one end of the handle constituting its lower end. The boom is in communication with the handle for flow of liquid through the handle to the boom and thence through the boom, the latter having a plurality of spray nozzles spaced along its length. A wheeled support is pivoted for swinging movement relative to the boom, and an adjustable interconnection is provided between the wheeled support and the handle. This enables the boom to be set in either an inboard or outboard position and at adjusted elevation above ground level. Other objects and features will be in part apparent and in part pointed out hereinafter.

BRIEF DESCRIPTION OF THE DRAWING

Corresponding reference characters indicate corresponding parts throughout the drawing.

DESCRIPTION OF THE PREFERRED EMBODIMENT

Figure 1:
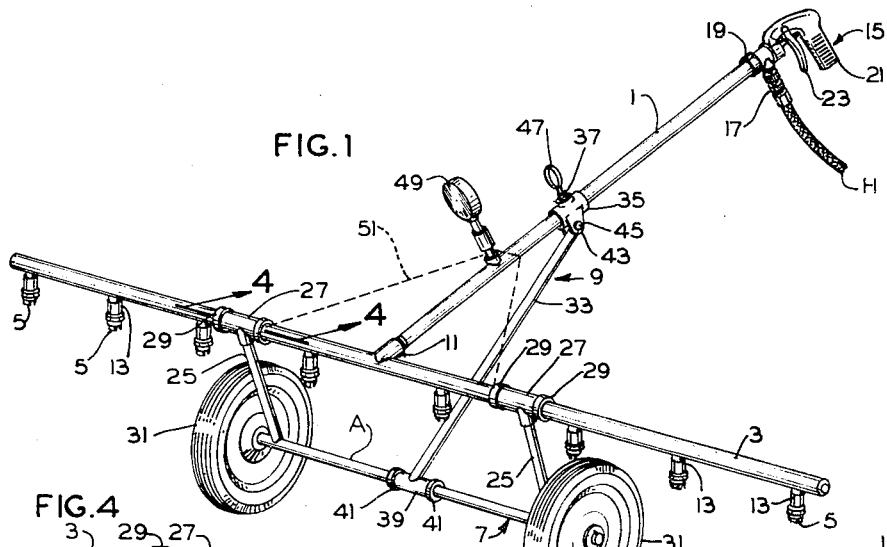
FIG. 1 is a perspective of a sprayer of this invention, showing the boom thereof in an outboard position.

Referring to the drawing, a wheeled mobile adjustable sprayer of this invention is shown to comprise an elongate tubular handle 1. At 3 is indicated an elongate tubular spray boom extending transversely of the handle at one end thereof constituting its lower end. The boom is in communication with the handle for flow of liquid through the handle to the boom and thence through the boom to a plurality of spray nozzles 5 spaced at intervals along the length of the boom. A wheeled support generally designated 7 is pivotally connected with the boom for swinging movement relative to the boom. An adjustable interconnection generally designated 9 is provided between the wheeled support 7 and the handle 1.

The handle 1 consists of a length of pipe or tubing. The boom 3 consists of a straight length of pipe or tubing having its ends closed in any suitable manner and provided at the center of its length with a lateral inlet fitting 11 in which the lower end of the handle is threaded. The boom has lateral outlet fittings 13 spaced at equal intervals along its length on opposite sides of the center of the boom for connection of the spray nozzles 5. The latter are of a conventional type for atomizing liquid discharged under pressure therethrough and spraying it downward in a pattern which fans out in downward direction toward the ground. At the upper end of the handle 1 is a manually operable valve 15 of a type such as shown in U.S. Patent 2,956,752, for example, having an inlet fitting 17 to which is connected a hose H from a mobile pressurized source (not shown) of the liquid to be sprayed, and an outlet fitting 19 connected to the upper end of the handle, the valve also having a pistol grip 21 and a trigger 23 for opening the valve for flow of liquid from the hose through the handle 1 to the boom 3. As shown, the handle 1 is straight, but it may have a slight bend at its upper end so that the pistol grip may rest more naturally and comfortably in the hand.

The wheeled support 7 comprises a pair of arms 25 pivotally connected at one end thereof constituting their upper end to the boom 3 for swinging movement relative to the boom, carrying at their lower end an axle A extending parallel to the boom. Each arm 25, as shown, consists of a short straight length of pipe or tubing having the stem of a T-fitting 27 fastened on its upper end, the boom being journalled in the heads of these T-fittings. These heads are retained against longitudinal movement on the boom, while permitting swinging of the arms relative to the boom, at equal distances on opposite sides of the handle 1 by collars 29 suitably secured on the boom at opposite ends of the heads of fittings 27. Each T-fitting 27 is shown as having a one-piece head, but it will be understood that the head may be a two-piece split head, with its two halves held together by bolts, or a two-piece head in which the two halves are hinged together and held in closed position by a bolt, and the two-piece head construction may be preferred. The axis is secured to the arms 25 at their lower ends as by welding, and has wheels 31 journalled thereon located on the outside of the arms.

The adjustable interconnection 9 between the wheeled support 7 and the handle 1 comprises a link 33, which may consist of a length of pipe or tubing, pivotally connected at one end constituting its lower end to the axle A at the center of the latter and pivotally connected at its other end, i.e., its upper end, to a member 35 slidable longitudinally on the handle to different positions of adjustment thereon, with means 37 for holding member 35 in any adjusted position thereof. The link is pivotally connected to the axle by having a tubular crosshead 39 thereon at its lower end, the axle extending through this crosshead and the crosshead and axle benig relatively rotatable. The crosshead is held against axial shift on the axle by means of collars 41 suitably secured on the axle at opposite ends of the crosshead. Member 35 is constituted by a relatively short sleeve having a pair of downwardly extending spaced lugs 43 in which the upper end of the link 33 is pin-connected as indicated at 45. Means 37 consists of a set screw threaded in a tapped hole in sleeve 35 having a handle 47 constituted by a ring for facilitating turning of the screw. A pressure gauge 49 may be connected to handle 1 adjacent its lower end, preferably being located far enough down on the handle so as not to be in danger of being knocked off by the hose H and to provide a positive indication of the effective fluid pressure, but without interfering with the adjustment of the boom.

In a typical embodiment of the invention, the handle 1 may be about four feet two inches long, the boom 3 about seven feet long with the nozzles 5 spaced at ten inch intervals, the arms 25 about eleven inches long, the axle A about two feet long and the link 33 about two feet long. The handle and boom are preferably formed of corrosion resistant pipe or tubing, e.g., stainless steel pipe or tubing, and arms 25, axle A and link 33 also formed of similar material. The parts may be made of other suitable metals or of plastic.

Figure 3:
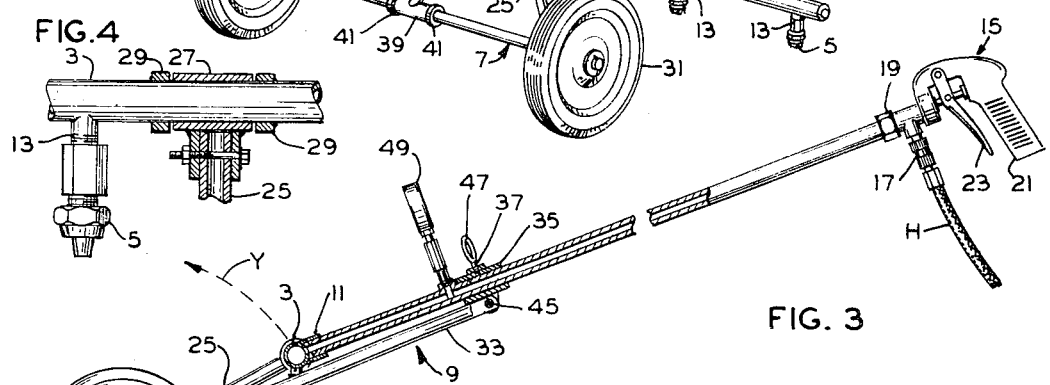
FIG. 3 is a longitudinal section, showing the boom in an extreme inboard position.
Figure 4:
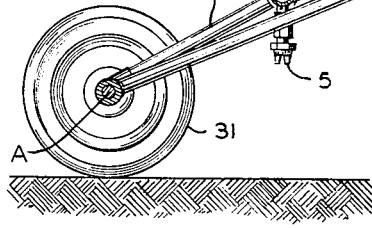
FIG. 4 is a section on line 4—4 of FIG. 1, showing a detail.
Figure 2:
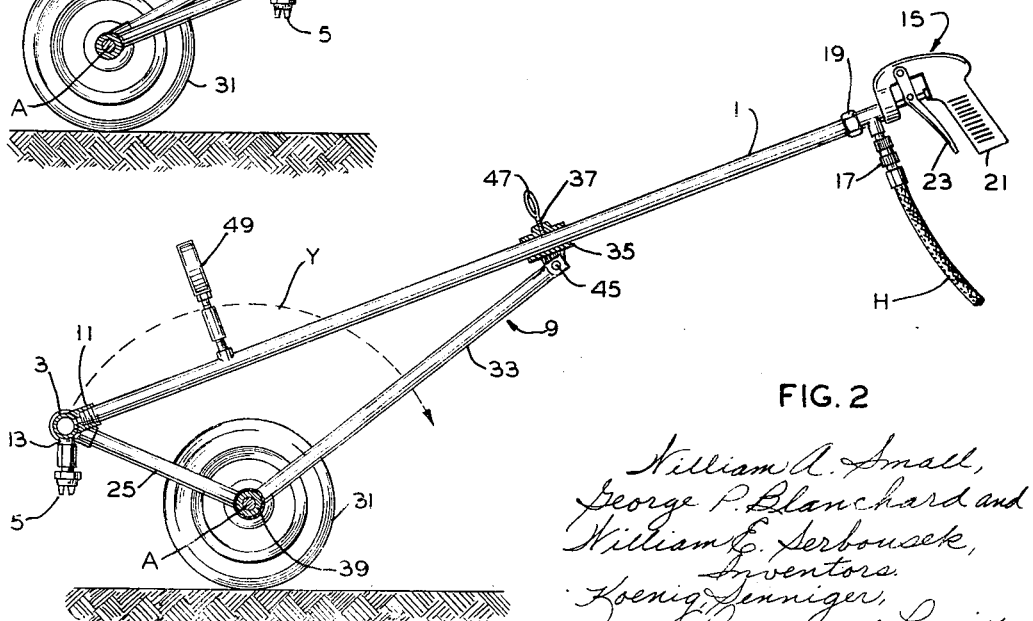
FIG. 2 is a longitudinal section, showing the boom in an outboard position.

By adjustment of the sleeve 35 up or down on the handle 1, the spray boom 3 may be set either in an outboard position or in an inboard position, at a selected elevation above ground level in either of such positions according to the pressure of the liquid being sprayed. FIG. 2 shows the sleeve 35 in a raised position with respect to the handle and the boom in an outboard position, for pulling the sprayer, and FIG. 3 shows the sleeve 35 at the lower limit of its range of adjustment and the boom in an extreme inboard position, for pushing the sprayer. The boom may be set at various intermediate outboard and inboard positions, between limits, with corresponding adjustment of the elevation of the boom above ground level, by suitable positioning of the sleeve.

As above noted, the boom 3 is set at an elevation above ground level (i.e., at an elevation above the bottom of wheels 31) according to the pressure of the liquid to be sprayed. This pressure is set at the mobile pressurized source (not shown) which is connected via hose H to the inlet 17 of the valve 15. The pressure is selected from a chart which shows the appropriate pressures for spraying to provide various quantities of the liquid over a given area (e.g., so many gallons per thousand square feet) at the usual walking rate. Instructions for using the sprayer including the chart may be printed on a large instruction plate such as indicated in phantom at 51 in FIG. 1 suitably attached to the handle and boom. The boom is set at an elevation such that, for the selected spray pressure, the spread of the spray pattern from the nozzles is slightly greater than the spacing of the nozzles, this providing full coverage without excessive overlapping. This is accomplished very simply by loosening the set screw 37 and effecting sliding of the sleeve 35 up or down on the handle 1 to the appropriate position of adjustment, then tightening the set screw. It will be observed that the effect of sliding the sleeve up or down is to swing the boom in an arc centered in the axis of the axle A, thus changing the elevation of the boom above ground level as well as enabling it to be set in outboard and inboard positions. In FIGS. 2 and 3, the arc of swing of the boom is represented at Y.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. A sprayer for being wheeled over the ground for spraying a liquid thereon comprising an elongate tubular handle, an elongate tubular spray boom extending transversely of the handle at one end thereof constituting its lower end, said boom being in communication with the handle for flow of liquid through the handle to the boom and thence through the boom, said boom havng a plurality of spray nozzles spaced along its length, a wheeled support pivoted for swinging movement relative to the boom, and an adjustable interconnection between said wheeled support and the handle whereby the boom may be set in either an inboard or outboard position and at adjusted elevation above ground level.

2. A sprayer as set forth in claim 1 wherein said handle has a manually operable valve at its upper end having an inlet adapted for connection of a line from a pressurized source of supply and having an outlet connected to the handle.

3. A sprayer as set forth in claim 2 wherein said adjustable interconnection comprises a member slidable longitudinally on the handle to different positions of adjustment thereon, means for holding said member in any adjusted position thereof, and a link pivotally connected at one end thereof to said member and at its other end to said wheeled support.

4. A sprayer as set forth in claim 3 wherein said member comprises a sleeve slidable on the handle and said holding means comprises a set screw threaded in the sleeve for interengagement with the handle.

5. A sprayer as set forth in claim 4 wherein the set screw has a handle constituted by a ring.

6. A sprayer as set forth in claim 4 wherein said wheeled support comprises arms pivotally connected at one end thereof constituting their upper end to the boom for swinging movement relative to the boom, and an axle carried by said arms at the lower end thereof extending parallel to the boom, said link being pivotally connected at its said other end to said axle.

7. A sprayer as set forth in claim 6 wherein said arms have fittings at their upper ends receiving the boom.

8. A sprayer as set forth in claim 7 wherein said fittings are T-fittings, the boom being journalled in the heads thereof.

9. A sprayer as set forth in claim 8 wherein said link has a tubular crosshead at its said other end receiving the axle.

References Cited

UNITED STATES PATENTS

| 2,144,890 | 1/1939 | Nakaoka | 239—287 |
| 3,423,027 | 1/1969 | Small et al. | 239—287 |

M. HENSON WOOD, Jr., Primary Examiner

M. Y. MAR, Assistant Examiner

U.S. Cl. X.R.

239—550